United States Patent [19]

Verma et al.

[11] Patent Number: 4,833,618

[45] Date of Patent: May 23, 1989

[54] SYSTEM FOR AUTOMATICALLY READING UTILITY METERS FROM A REMOTE LOCATION

[75] Inventors: Shiv P. Verma, Cedar Knolls; K. S. Lin, Plainsboro, both of N.J.

[73] Assignee: Net Laboratories, Inc., Iselin, N.J.

[21] Appl. No.: 831,404

[22] Filed: Feb. 20, 1986

[51] Int. Cl.[4] .................................................. H04M 11/00
[52] U.S. Cl. .................................... 364/483; 379/107; 340/870.02
[58] Field of Search ............... 364/483, 481, 550, 551, 364/464; 340/870.02, 870.03; 324/118; 379/107, 40, 41, 51, 102, 105

[56] References Cited

U.S. PATENT DOCUMENTS

| Re. 26,331 | 9/1968 | Brothman et al. | 379/27 |
| 2,870,258 | 1/1956 | Cooper | 379/107 |
| 3,564,143 | 2/1971 | Stewart, Jr. | 379/107 |
| 3,588,357 | 6/1971 | Sellari, Jr. | 379/107 |
| 3,742,473 | 6/1973 | Hadden | 340/870.02 |
| 3,778,771 | 12/1973 | Whitaker | 340/870.02 |
| 3,899,639 | 8/1975 | Cleveley et al. | 340/870.02 |
| 3,922,490 | 11/1975 | Pettis | 379/107 |
| 3,937,889 | 2/1976 | Bell, III et al. | 379/107 |
| 4,008,458 | 2/1977 | Wensley | 340/870.02 |
| 4,059,727 | 11/1977 | Kingswell | 379/107 |
| 4,085,287 | 4/1978 | Kullmann et al. | 375/7 |
| 4,179,654 | 12/1979 | Germer | 364/483 |
| 4,291,376 | 9/1981 | McCahill | 364/483 |
| 4,301,508 | 11/1981 | Anderson et al. | 364/483 |
| 4,332,980 | 6/1982 | Reynolds et al. | 364/870.02 |
| 4,388,611 | 6/1983 | Haferd | 364/483 |
| 4,388,690 | 6/1983 | Lumsden | 364/483 |
| 4,394,540 | 7/1983 | Willis et al. | 379/107 |
| 4,455,453 | 6/1984 | Parasekvakos et al. | 379/107 |
| 4,463,354 | 7/1984 | Sears | 340/870.02 |
| 4,467,434 | 8/1984 | Hurley et al. | 364/483 |
| 4,489,220 | 12/1984 | Oliver | 379/107 |
| 4,495,596 | 1/1985 | Sciulli | 379/107 |
| 4,504,831 | 3/1985 | Jahr et al. | 340/870.02 |
| 4,531,193 | 7/1985 | Yasuhara et al. | 364/551 |
| 4,540,849 | 9/1985 | Oliver | 379/97 |
| 4,542,469 | 9/1985 | Brandyberry et al. | 364/483 |
| 4,575,801 | 3/1986 | Hoberman et al. | 364/483 |
| 4,578,536 | 3/1986 | Oliver et al. | 379/107 |
| 4,621,330 | 11/1986 | Weikel | 364/483 |
| 4,628,313 | 12/1986 | Gombrich et al. | 340/870.02 |
| 4,639,728 | 1/1987 | Swanson | 379/107 |

Primary Examiner—Parshotam S. Lall
Assistant Examiner—S. A. Melnick
Attorney, Agent, or Firm—Hedman, Gibson, Costigan & Hoare

[57] ABSTRACT

A system for automatically collecting and storing utility data and transmitting the stored data from the user premises to a remote location. The system comprises interface means for converting the utility usage data into data signals that can be recorded and a microprocessor for storing the utility information and controlling the transmission of the information from the user premises to the central location. The system is provided with the controls to insure that power is used only when system functions are necessary and controls are provided to insure that delivery of information can be obtained by transmission from the user premises to the utility by initiation of a telephone call from the user premises only at pre-determined times or from the remote collection area also at pre-determined times without interferring with the users use of the conventional telephone line.

2 Claims, 7 Drawing Sheets

SYSTEM FOR AUTOMATICALLY READING UTILITY METERS FROM A REMOTE LOCATION

BACKGROUND OF THE INVENTION

The present invention relates to utility meter monitoring systems and particularly to a system for automatically and remotely reading and processing data from one or more utility meters.

Efforts have been made to automate utility meters; i.e., gas, electric, water, for many years. The reason for the efforts is abundantly clear. The present manual system requires meter readers to visit every user premises, residence and business, and actually read the utility consumption from the meter dials. The cost is considerable and the reliability is subject to human error.

The various efforts to automate utility meter readings have included early efforts to use wireless devices and direct wiring between the user facility and utility. These efforts have not materialized, probably due to the high cost involved.

Other proposed systems have focused on use of existing telephone lines to facilitate utility meter reading.

One system described in U.S. Pat. No. Re. 26,331 Brothman et al. relies on the telephone leakage testing systems, which varies from company to company and is subject to change. Other systems have utilized the tip and ring of the telephone line to provide a communication line between the utility meter and the utility office. In U.S. Pat. No. 3,922,490, Pettis, a D.C. system is disclosed in which resistances are switched on and off across the tip and ring of a telephone line by the least significant digit pointer of the utility meter. Each resistance change is sensed in a central office and counted. An A.C. system described in U.S. Pat. No. 4,540,849 Oliver also relies on the tip and ring of the telephone line but is a one way communication system adapted to be powered by the telephone line when in the idle ON-HOOK condition. Although these various systems have their particular functions and advantages they all lack broad versatility and adaptability for use with a wide variety of utility meters The present invention is directed to providing a fully automated, error-free, two-way system for remotely reading and managing the data from utility meters of all types in a rapid and efficient manner.

The present system is intended to save utility companies tremendous meter reading expense, provide essentially 100% coverage of all meters, speed up billing cycles and improve customer relations. Furthermore, through the use of the system a utility can position itself in the future as an energy manager as well as a utility supplier.

SUMMARY OF THE INVENTION

The invention embodies a system comprising a Remote Data Unit (RDU) located at an end-user site for monitoring, accumulating, and reporting usage data from locally disposed meters, and a Utility Data Processor (UDP) at the utility site for collecting the usage data sent from the RDU over a conventional telephone network and assembling and transmitting the data to a utility host for administrative processing and billing.

The RDU is a self contained essentialy tamper proof unit in which a microcomputer, with program and data memories, is housed The microcomputer is the RDU central control unit to which meter sensor interface means are connected for providing usage data thereto from various utility meters to the microcomputer. The control unit output is connected to a digital communications interface which collects the data in proper form for digital to analog conversion and transmission over the telephone network. A Local Area Network (LAN) interface unit may also be connected to the control unit for passing further information to the UDP at the other end of the phone network The RDU includes built-in hardware and software which comprise an event driven tasking system for executing several concurrent tasks to implement its various collection and communication functions.

The UDP is located at a central office or utility site and includes a microcomputer with programs and storage for collecting and reading the usage information from the RDU and assembling and passing the information to utility main host computers. The UDP software is also structured in an event driven tasking system and controls communication with both the RDU and host computers as well as providing an on-line diagnostic.

In effect, the system is designed to count each rotation of the least significant dial of one or more utility meters at a particular premises and to store the sum of each utility usage in a separate register allocated to the particular utility; i.e., gas, water, electric. Each utility usage is accumulated in the assigned register. At a specific predetermined time during one day of the billing cycle or period, the RDU calls the UDP and transmits the utility usage information from the RDU to the UDP. This specific predetermined time is conveniently characterized as the report time. The time required to transmit the utility usage is very short, i.e., several seconds In addition, an "answer window" is opened in the system on a regular basis by virtue of programming specific times, such as, every day for a period of time during which the UDP can call the RDU. Only during the time that the "answer window" is open will the RDU receive a call from the UDP.

The system includes digital communication with protocol and security protections, on-hook operation that prevents the system from interfering with telephone use by the resident, power conservation measures using telephone line power with battery backup and inherent means for recharging the battery, and Local Area Network expansion capability.

DESCRIPTION OF THE PREFERRED EMBODIMENT

A remote energy management system in accordance with the invention is a fully automated, error free, two-way system for remote reading and managing of utility meters. The system is fully automated in that the meter reading and management process is operated free from human involvement. Accuracy, speed, efficiency, and cost-effectiveness are achievable with the present system.

Figure 1:
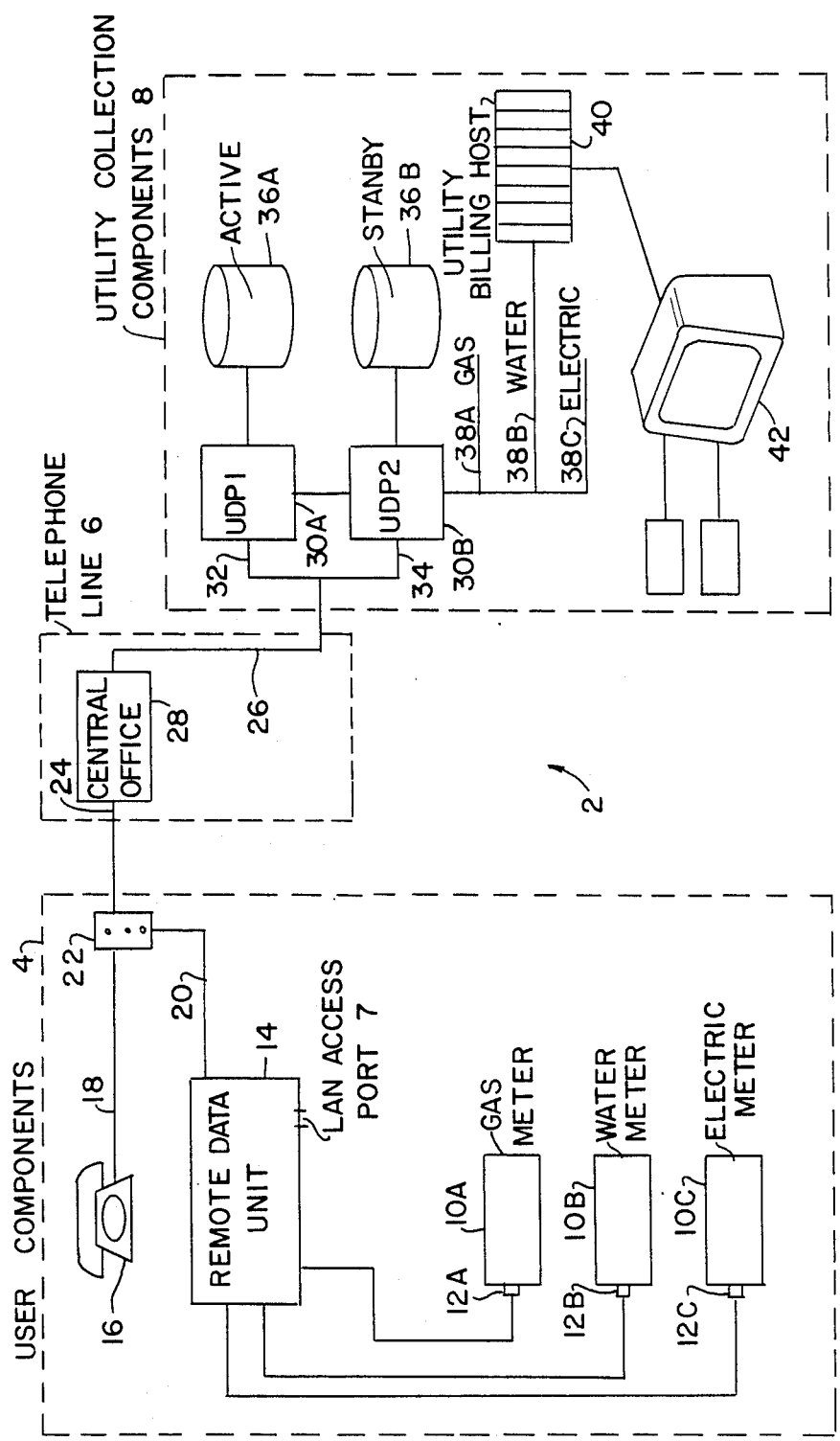
FIG. 1 is a system diagram illustrating various components which may be used in constructing a system in accordance with the present invention.

The embodiment of the present invention depicted in FIG. 1 is an overall Remote Energy Management System 2 comprised in general of system components located on the utility user premises 4, conventional telephone equipment 6 and utility data collection components 8. The system also includes means for providing Local Area Network (LAN) services. A LAN access port 7 is shown illustratively in FIG. 1.

Basically, the system components located at the user premises 4 are comprised of conventional utility meters shown illustratively as a gas meter 10A, a water meter 10B and an electric meter 10C, respective meter sensors 12A, 12B and 12C, a Remote Data Unit (RDU) 14, and conventional telephone equipment such as a telephone line 24, telephone junction box 22 and lines 18 and 20 to the users telephone 16 and RDU 14 respectively.

The telephone equipment 6 required outside of the user premises comprise conventional telephone lines 24 and 26 extending from the telephone company central office 28 respectively to the utility user components 4 and the utility collection components 8 which enable the RDU 14 and a Utility Data Processer (UDP) 30A or 30B to communicate by conventional telephone calling.

The Utility collection components 8 are comprised essentially of the UDP 30A and 30B, storage units 36A and 36B, lines 38A, 38B and 38C to the respective utilities, utility billing hosts 40 and utility processing equipment 42.

Figure 2:
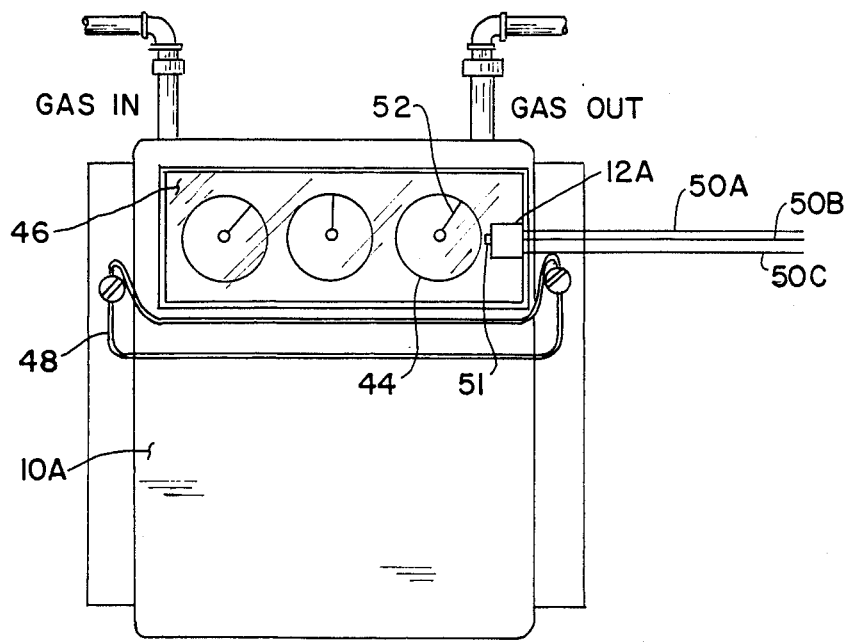
FIG. 2 is an elevational view of a utility meter on which a meter sensor is mounted.

As best seen in FIG. 2 a conventional gas meter 10A is provided with a conventional meter sensor 12A which generates an electrical pulse for each rotation of the lowest unit dial (least significant dial) 44. The sensor 12A is shown as a magnetic sensor rigidly fixed to the face of the gas meter 10A adjacent the dial 44 with the magnetic sensor probe 51 arranged to be tripped by a magnetized point 52 on the dial 44 which energizes the sensor 12A once for every rotation of the dial 44. The conventional sealed transparent plate 46 of the gas meter 10A covers the dial 44 and sensor 12A to prevent unwarranted access to either. Sensor conductors 50A, 50B and 50C extend from the sensor 12A through the seal around the transparent plate 46 to the RDU 14.

In general, virtually any type of meter sensor may be used with the system 2 including sensors of the magnetic sensing type, encoder type, pulse generating type, and Hexagram sensor type. Illustrative of a meter sensor suitable for use in the system is the American Meters electric sensor Serial No. 52549K004.

An encoder meter such as the Neptune water meter does not require a sensor interface since it is provided with built in electronics to encode the indices and convert to electrical signals.

Figure 3:
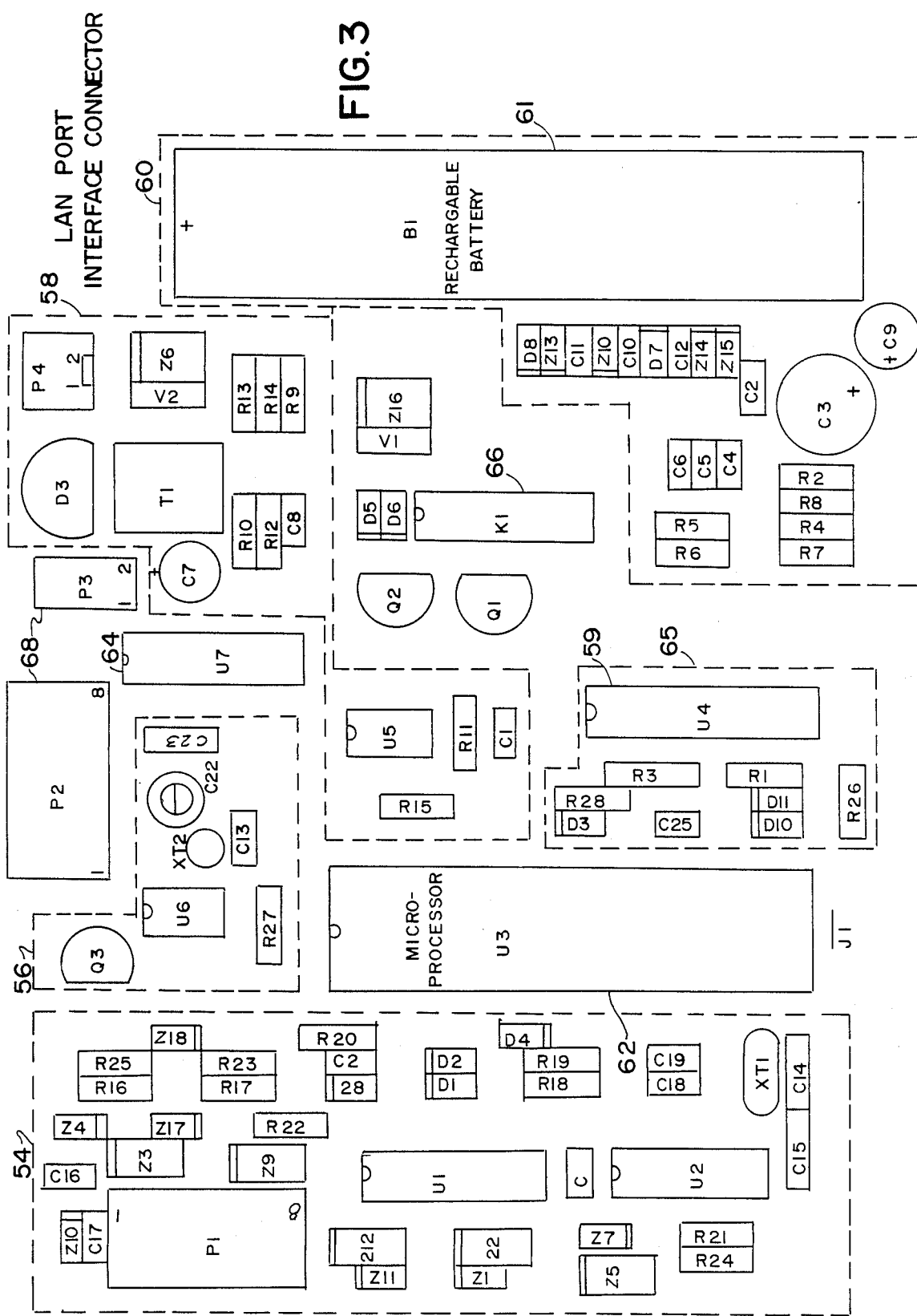
FIG. 3 is a plan view of the Remote Data Unit (RDU) circuit components.
Figure 4:
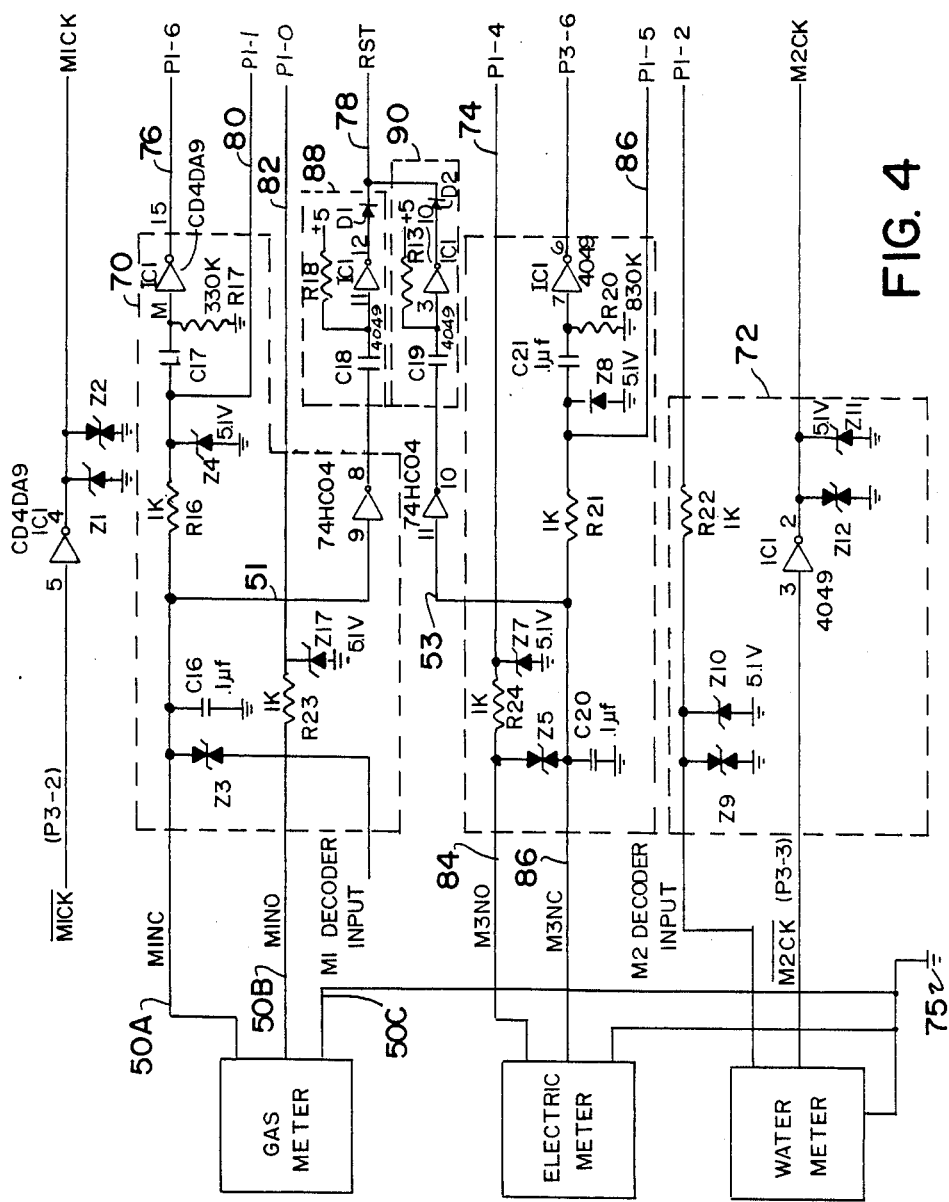
FIG. 4 is a schematic circuit diagram showing a set of components making up the Meter Sensor Interface System of the RDU.
Figure 5:
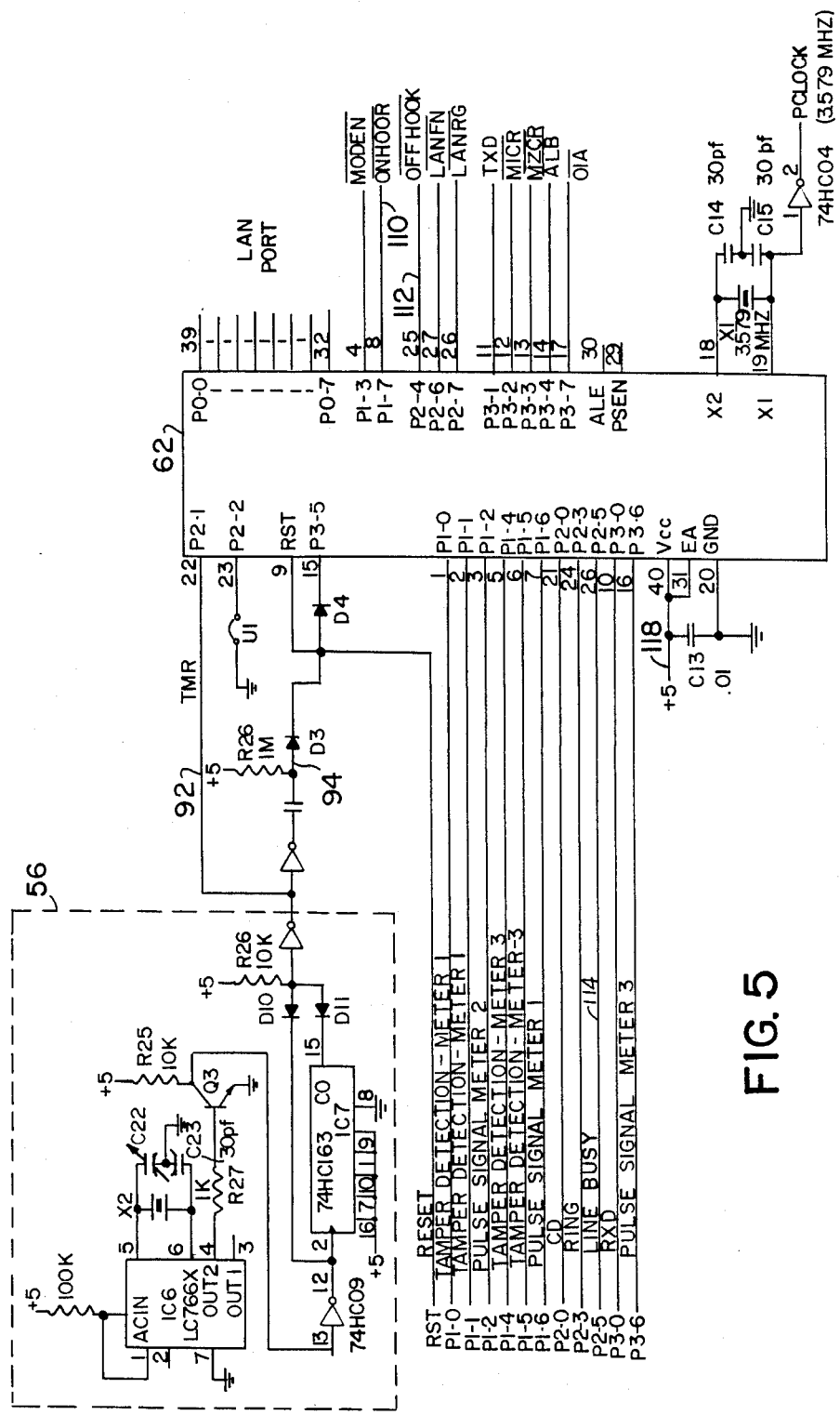
FIG. 5 is a schematic circuit diagram showing a set of components making up the Central Control, Timing Pulse circuitry and LAN Interface.
Figure 6:
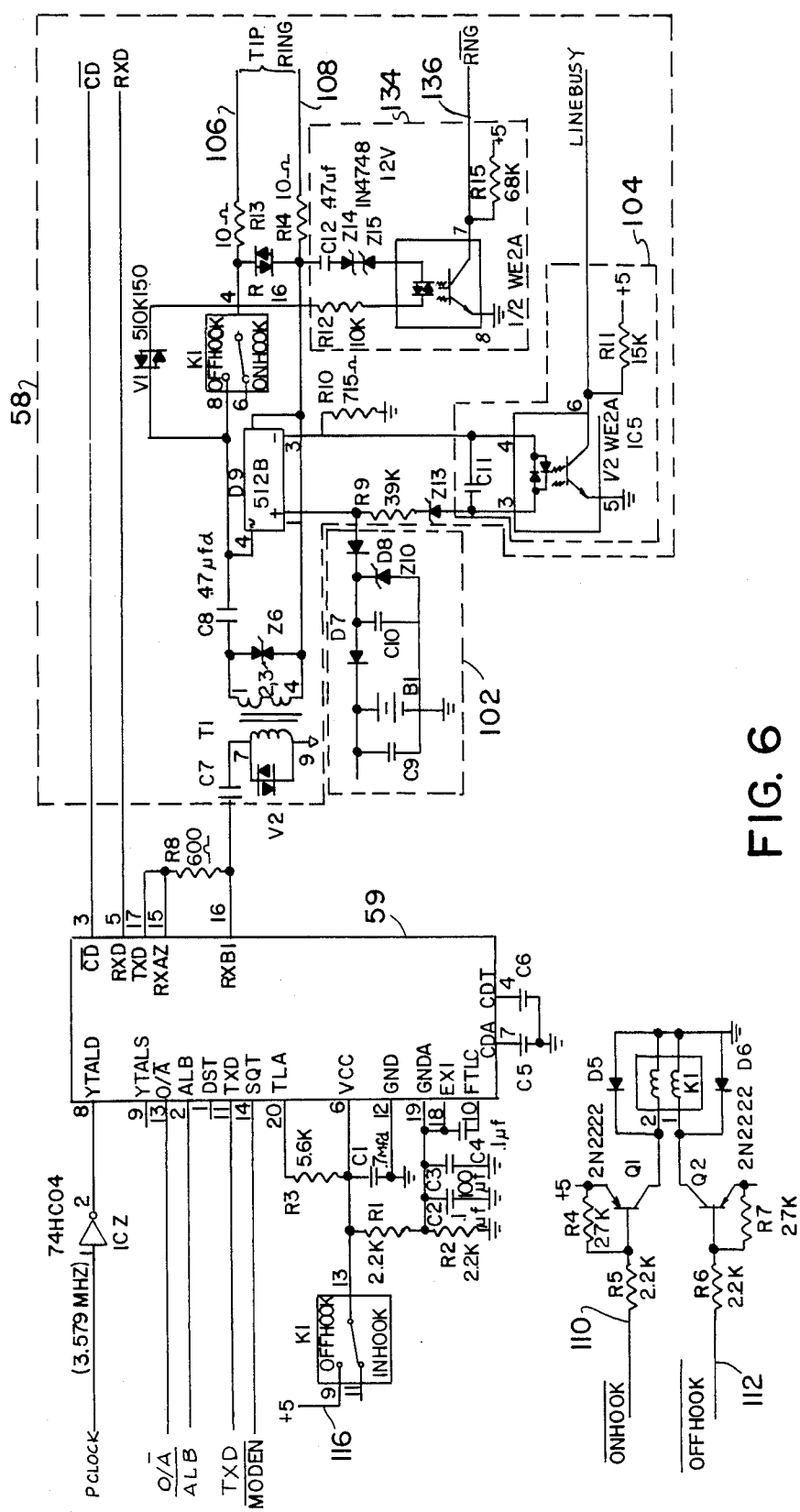
FIG. 6 is a schematic circuit diagram showing a set of components making up the Data Communication Unit of the system.

The overall RDU 14 is best seen and understood by the depiction of FIG. 3 and the circuitry of FIGS. 4, 5 and 6. FIG. 3 is a plan view of the printed circuit board wherein components of the particular preferred embodiment are displayed. The components are comprised essentially of the gas, water electric sensor connection assembly 54, timing pulse assembly 56, media or data access arrangement assembly (DAA) 58, power unit 60 including the battery 61, the microprocessor 62, a timer 64, data communication assembly 65 and a Relay 66 (K1). The printed circuit board of FIG. 3 also is provided with Local Area Network (LAN) port interface connectors 68 which are connected to the microprocesser 62. The component assembles are identified by reference characters in FIG. 3 as generally encompassing the various specific components including circuit resistors, diodes, etc. However, the specific circuitry and proper arrangement of each component in the circuit are found in FIGS. 4, 5 and 6.

Although a variety of components can be used in the respective assemblies, a suitable selection of components comprise sensor assembly chips U1 and U2 which are respectively CD4049 RCA and 74HC04, a timing pulse generator 56 which is a Sanyo Timer Chip, a microprocessor 62 which is an INTEL 80C51, a Modem chip U4 of the data communication assembly 65 which is a 74HC943, a chip U5 of the media access arrangement 58 which is a Western Electric 2A and a chip U7 serving as the timer 64 which is a 74HC163.

The components of the RDU 14 are seen operationally in FIGS. 4, 5 and 6, where they are identified with the same nomenclature as in FIG. 3.

FIG. 4 shows the RDU components of the sensor assembly 44 that provide the pulse shaping and tamper proofing functions of the system.

Pulse shaping of the signal sent from meter sensors 12A and 12B occurs as the signal is passed through the pulse shaping circuits 70 and 72. The pulse shaping components are set to shape the pulse to 22 milliseconds. The signals from the gas meter sensor 12A are delivered through lines 50A and 50B to the pulse shaper 70 while line 50C is connected to a ground 75. The shaped pulse of 22 milliseconds is transmitted through a line 76 to pin P1-6 of the microprocessor 62 (best seen in FIG. 6).

When the meter dial passes the magnetic sensor the magnetized point 52 of the dial 44 triggers the sensor contact 50 which in turn changes the polarities of the two signal leads. The signal lead 50B connected to the pulse shaping circuit 70, as shown in FIG. 4, produces an active low pulse of 22 millisecond duration no matter how long or short the changes of polarities in the signal leads caused by the sensor contact switch. The other signal lead 50A communicates through line 51, circuit 88 and line 78 to cause a reset by the reset circuit of the microprocessor 62.

Signal lines 80 and 82 extend respectively from the gas meter sensor line 50A and 50B to pins P1-1 and P1-0 of the microprocessor 62. These signal lines are designed such that at all times during the sampling time they will be of opposite polarities. Thus, if the connections are tampered with whereby one line is either shorted to the other or disconnected, the polarities of the two signal leads will not be different all the time. This mechanism is used to detect any disconnection or tampering of the connection from the meter sensor to the RDU. The RDU is disposed in a sealed housing, the opening of which causes a signal lead to be disconnected. The existence of the same polarity for each signal will cause the RDU to alert the UDP that repair and correction of the sensor means are necessary.

As can be seen from FIG. 4, the signal lines 84 and 86 extend respectively from the electric meter sensor lines (not shown) in the same way signal lines 80 and 82 do from the gas meter lines and connect to pins P1-4 and P1-5 to provide tamper detection in the same way. Similarly, line 53 and circuit 90 are provided to reset the microprocessor circuitry.

The microprocessor 62 is the Central Control Unit (CCU) of the system and has program memory as well as data memory, and is used to provide all the intelligence necessary for the control of the entire unit. The processor 62 itself has the ability to get into idle as well as power-down mode for the sake of power conservation.

The circuitry in which the clock and calendar are arranged includes switch means within the microprocessor 62 to close a circuit with the power input line 118 to the microprocessor The system requires power and uses power only for the following functions:
(a) set clock and calendar;
(b) record sensor pulse; and
(c) transmit or be available to transmit to the UDP at Answer Time ("Answer Window") or report time.

As seen again in FIG. 5 the signals from the meter sensors are delivered to the microprocessor 62 for accumulation of the usage totals and to monitor any tampering of the meter sensors. In addition, the microprocessor 62 is used to implement the other tasks of the system as will be described.

The timing pulse generator 56, seen in FIGURES 3 and 5 is used to produce a pulse also of 22 milliseconds at an accurate frequency and is connected to the microprocessor 62 by lines 92 and 94. The pulse is generated every 32 seconds to cause a reset of the microprocessor 62 which uses the timing pulse to update an internal time-of-day clock and calendar. The timing pulse generator 56 is powered by the battery 61 through line marked "+5". The power of the order of micro watts, delivered from the battery 61 through the line marked "+5" to the pulse generator 56 is shaped into an out-pulse pulse of 22 milliseconds. The signal is delivered through line 94 to the microprocessor 62 to add the 32 second increment to the time-of-day clock and calendar.

The clock and calendar in the microprocessor 62 serve to alert the system of the occurrence of a report time (which occurs once every billing cycle) and the "answer window" (which occurs once every day). The report times may be programmed into the RDU at the time of installation or by the UDP during communication therewith. During the report time, the RDU calls the UDP and transmits the monthly information embedded in a proprietary protocol to the UDP. During the "answer window" each day the RDU is awakened and alerted to receive a call from the UDP. When the "answer window" is open, the relay K1 (FIG. 6) is in the ON HOOK position unless transmission of utility data is occurring. Thus, removal of a telephone receiver at the user promises during the "answer window" during data transmission will energize the relay to open to the ON HOOK position and disable the "answer window". Any call that comes to the RDU during the "answer window" will be accepted immediately within twenty microseconds before the phone bell is actuated and will receive an answer from the RDU that requests login information. If the login information and password are not conveyed to the RDU, the RDU will terminate the call. This procedure requires only a few milliseconds. If the proper login and password are given to the RDU, the RDU will transmit the desired information. The details of the procedure are described more fully below.

FIG. 6 displays the circuitry of the telephone line interface 58, the modem 59 and the battery charging circuit 102. The telephone line interface 58 (media or data access arrangement unit) is a digital communication interface which includes the modem 59 and the circuit 104 for detecting an OFF-HOOK line busy condition and the connections 106 and 108 to the tip and ring of the telephone line.

The telephone line interface or DAA provides isolation of the RDU from the telephone line through a latching type relay K1 which is used by the microprocessor 62 to control the ON HOOK/OFF HOOK status of the system.

The relay K1 is in the open or ON-HOOK position at all times except during data transmission in the "answer window" period. When the microprocessor 62 needs to communicate with the UDP due to the occurring of the monthly report time or an incoming call during the "answer window" time, the microprocessor 62, through the OFF-HOOK line 112 energizes the relay K1 to set the relay in the OFF-HOOK mode.

The microprocessor 62, at report time, then begins to dial the UDP over the telephone line. After each digit the microprocessor 62 waits 70 milliseconds (the minimum interdigit time) before sending the next digit, thus minimizing the CPU time and power requirements.

The circuit includes the line busy detect circuit 104 which operates only during the OFF-HOOK state to detect a user phone being lifted from the hook. When a user phone is lifted from the hook during the OFF-HOOK state a signal is delivered to the microprocessor 62 through line 114 and the ON-HOOK signal is transmitted through line 110 to energize the relay K1 to switch from OFF-HOOK to ON-HOOK and open the telephone communication circuit thereby disabling communication between the RDU and the UDP. The media access arrangement unit 58 allows interfacing with the communication media without causing any harm to the media. The communication interface detects ringing and other telephone off-hook status. If at any moment a telephone connected to the same line goes off-hook, the central controller will detect the condition and relinquish the line immediately, so that there will not be interference with the normal use of the telephone.

When the "answer window" is open the RDU will respond to an incoming call before the user telephone can ring. Typically, the mechanism to effect ringing of a telephone requires several milliseconds to energize the ringing bell. The RDU ring detection circuitry 134 comprising capacitor C-12 and zener diodes Z-14 - Z-15 in series with the transistor WE2A and resistor R-12 respond in several microseconds to transmit the signal through line 136 to the microprocessor 62. When the microprocessor 62 receives the first ring indication signal it acts in a few microseconds to cause the line to go OFF-HOOK thereby stopping the telephone ring signal emanating from the telephone company central office.

The battery 61 powers the system by delivery of power through lines 116 and 118 to the modem 59 and microprocessor 62 respectively.

The modem circuit 59 provides signal conversion between digital and analog forms. The digital data signals are converted to analog A.C. for transmission over the phone system. At the site of the UDP, the analog signals are converted back to digital form for processing in the computer.

The entire Data Communication Interface unit is normally powered off when it is not used by virtue of the opening of relay K-1 to the ON-HOOK position.

The power supply unit as seen in FIG. 6, is provided to power the entire RDU. It consists of the conventional rechargable battery 61 and the charging circuit 102. In the case where the system is connected to a telephone line, it draws power from the telephone line when the relay K-1 goes OFF-HOOK The RDU is so designed that it uses power in micro-watts during ON-HOOK, and milli-watts during OFF-HOOK. The positive end of the power supply unit is connected to the tip of the phone line. The negative end is kept at 6 volts lower and is not connected directly to the ring of the phone line, resistor R10 being in the circuit. Therefore, if there is ever a short circuit of the RDU, the normal use of the phone line will not be disrupted. Normally when the RDU is not communicating with the UDP and the DAA is in the on-hook state, only the timing pulse generator 56 and the meter interface circuit 54 are powered. The microprocessor 62 is in a power-down mode almost all the time except when it is reset and awakened to perform meter reading and data base update. The rest of the RDU circuit is not powered. The telephone when ON-HOOK is provided with a line voltage of 48 v. The line voltage drops approximately 8 v. when a telephone receiver is lifted from the cradle. When the RDU goes OFF-HOOK, through the relay K1, the entire circuit is powered by the telephone line and the voltage across the tip and ring still is maintained at 22 volts. When another telephone goes OFf-HOOK, the tip and ring voltage drops to about 5 volts. The RDU takes advantage of this condition to detect the customer telephone OFF-HOOK status. If the RDU is communicating with the UDP and someone lifts up the phone, the drop in voltage causes the microprocessor to signal the opening of relay K-1 which will cause the RDU to relinquish the use of the telephone instantly whereby it is unlikely that any human could notice the activity.

The system also takes advantage of the reduced use of power by using the line power during OFF-HOOK operation to charge the rechargeable battery 61 through the recharging circuit 102.

As noted, the RDU is in the power down mode most of the time. When relay K-1 is energized to the OFF-HOOK condition at the onset of the "answer window", the companion relay K-1' will also be switched to the OFF-HOOK condition to power up the modem circuitry 65. Simultaneously, with the tripping of the K-1 relay to the ON-HOOK position, relay K-1' will be similarly tripped and switch off power to the modem circuitry 65.

The LAN Interface Unit embodies a Local Area Network Gateway consisting of an 8 bit data port and two handshaking control leads, as shown in FIG. 5. It is designed so that the 8 bit data port can be used either as a parallel port or as 8 individual serial ports The RDU is a store and forward point and only provides physical layer connection between the LAN devices and the UDP. The two communicating ends determine the data formats as well as meanings down to the bit level.

The Utility Data Processor (UDP) shown in FIG. 1 as 30A, 30B, is a communication front end to the utility main host computers 40. It is a computer with the needed programs and storage to collect and read utility usage information from the RDUs.

The UDP handles all communication protocols through the telephone network with the RDUs and assembles and transmits information to the utility main host computers 40. The UDP can be the operation, administration and maintenance control for the entire remote meter reading system. The hardware and software of the UDP can be tailored to meet the specific interface requirements of the utility main host computers. An AT&T UNIX-7300 with a HAYES 300 bauds Smart Modem is a suitable computer for the UDP service.

An illustration of the system 2 at work is seen in the following prophetic example.

Assuming that the least significant digit of a gas meter 12A makes 1 rotation for each two cu. ft. consumed. Assuming further that at 1:00 a.m. on a February 6 the billing date of the billing cycle on which the report time is due, the microprocessor 62 register for gas registers 2030 pulses since the previous report time. Between 1:00 a.m. and 2:00 a.m. the least significant dial of the gas meter rotates six times. Six pulses are generated by the sensor and each pulse is shaped to a 22 millisecond pulse by the pulse shaping circuitry. Each shaped pulse passes to the microprocessor 62 and is stored in the register allocated for the gas meter usage. (RAM is provided with a register for each service). Each shaped pulse enters the 6 digit decimal register as 2 cu. ft.

Thus, over the period from January 6 to February 6 which is the programmed billing cycle a total of 2036 pulses (2030 plus 6) have been generated equating to 4072 cu. ft. of gas.

At 2:02 a.m. on February 6 (the report time) the RDU is commanded by the clock task to activate the dialer task in the controller. A conventional 800 telephone member is automatically dialed by the RDU and the information in the gas register which is embedded in the proprietary protocol is convereted from digital to analog signals by the modem 59 and sent to the UDP. This information is then stored in the UDP for immediate or later transmission to the Utility main host computer.

If at anytime there is a question of customer usage, the RDU data base can be read out under manual control by the use of a user button J-1 (FIG. 5). Pressing of button J-1 will power the system through activation of relays K-1 and K-1' to the OFF-HOOK condition and cause the microprocessor 62 to transmit the usage information in its data base over the telephone line upon receipt of a call from the UDP.

RDU Software Design and Implementation

The RDU functions are implemented through the execution of several concurrent tasks in an event driven tasking system. The RDU does not use any external storage. In the preferred embodiment, it keeps all the programmable information in a database which fits into its internal RAM space. The information stored in the database includes:

customer ID, password;
UDP telephone number;
meter types, usage counts, status, report time and answer time.

Figure 7:
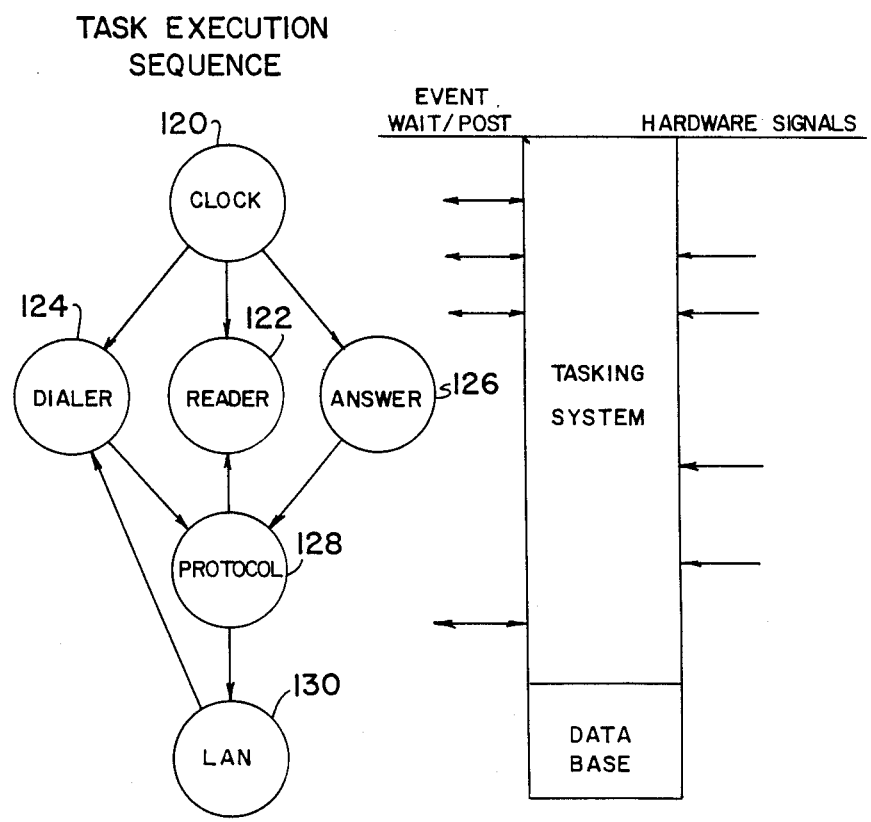
FIG. 7 illustrates the task execution sequence and firmware structure for the RDU in accordance with the invention.

As shown in FIG. 7, the RDU tasks are:

1. a clock task 120 which keeps a time-of-day and a calendar. It signals the RDU to call and report to the UDP or to answer the call from the UDP when the report time, answer time, or re-try time occurs 2. a reader task 122 which reads and accumulates the usage indicated by the meters. It supports the reading of the three meters 12A, 12B, 12C. The first meter can be either a magnetic sensor type or an encoder type. The second meter is an encoder type. The third meter is a magnetic sensor type. The usage accumulation of the third meter can be divided into three programmable time zones of day. The reader task also checks any tamper attempts on the meter connections.

3. a dialer task 124 which dials the UDP and establishes a communication link. It has a built-in re-dial and re-try mechanism so that if the communication link can not be established, it will re-dial for three times before scheduling a re-try at 10 minutes later. In the extreme case it could re-try three times before aborting the mission.

4. an answer task 126 which answers the call during the answer window and establishes a communication link with the UDP. The answer window is one or two minutes long and is programmable for the UDP.

5. a protocol task 128 which implements a proprietary communication protocol with the UDP. It provides security screen of unathorized access of the RDU, error detection and correction, and execution of the proprietary RDU-UDP controls and commands.

6. A local area network task 130 which passes the information between the local area network and the UDP.

Through these tasks, the RDU implements the functions described previously. When the RDU is not in the communication mode, it does not have anything to do until it receives either an external timing pulse or any inputs from the meter sensors (12A, 12B, 12C). The tasking system allows the processor to remain powered down in a powered down inactive mode almost all the time and to wake up and operate in a powered active mode for only a few own almost' all the time and to wake up milliseconds when there are tasks to run. Tremendous power conservation is achieved using this mechanism which allows the RDU to be powered by the telephone line with the backup power from the rechargeable battery.

RDU Operation, Administration and Maintenance

The RDU has built-in hardware and software to facilitate the operation, administration and maintenance of the system. The features are as follows:
set time of day;
set unit ID and password;
set phone number;
set communication time;
program the ON/OFF, types, and options of the meter interface ports and initialize the meter reading registers; and
record tamper attempts.

The following sections describe the scenarios of the RDU operations by using the Tasking System modules.

1. Meter Reading (a) For Magnetic/Pulse Generating Sensors

1. The sensor (12A) generates a pulse upon detecting the meter index dial passing through the sensor.
2. The pulse causes the Central Control Unit to go through a reset cycle if the RDU is in the power-down mode.
3. The Central Control Unit recognizes the presence of the pulse and schedules the Reader Task to run.

4. The Reader Task updates the usage register for the meter according to the programmable control information stored in the RDU database.
5. The RDU powers down if no other tasks are running.

(b) For Encoder Type of Sensor (12B)

1. The Protocol Task needs to report the reading of a meter which is marked as an encoder type in the RDU database. The Protocol Task activates the Reader Task to obtain the reading.
2. The Reader Task sends pulses to the encoder and decodes the pulse trains sent back from the encoder to obtain the reading of the meter. The reading is passed to the Protocol Task.
3. The Protocol Task sends the meter reading to the UDP.

2. RDU-UDP Communications (a) RDU Calling UDP

1. The Timer Task detects the match of the scheduled report time and the current time of the day and the date.
2. The Timer Task activates the Dialer Task to dial the UDP and establish the communication link.
3. The Dialer Task calls the UDP and waits until the link is established. If the communication link cannot be established due to any reason, the Dialer Task redials three times before it reschedules itself to retry 10 minutes later. The maximum number of retries is three. It then activates the Protocol Task.
4. The Protocol Task communicates with the UDP using the proprietary protocol. The information exchanged between the RDU and the UDP includes the meter readings, RDU status, LAN data, and RDU database contents. If the protocol handshaking gets disconnected for any reason, the Protocol Task reschedules itself for a retry 10 minutes later through the Timer Task. The maximum number of retries is three.
5. The UDP terminates the communication. The Protocol Task terminates. The RDU goes power-down if no other tasks are running.

(b) UDP Calling RDU

1. The Timer Task detects that the answering window time has arrived and activates the Answer Task to run.
2. The Answer Task waits for the "Ringing Indication" of the communication line. When it is detected, the Answer Task goes "off-hook" immediately before any other telephone sets connected to the same line can ring. The Answer Task waits to establish the communication link. If the communication link cannot be established due to any reason, the Answer Task disconnects the line by going "on-hook" immediately. When the answer window is over, the Answer Task terminates.
3. After the communication line is established, the Protocol Task takes over as in the previous case.

The Utility Data Processor Software

The UDP software implements the following functions:
1. supports a screen display and editor for displaying and entering the customers' records;
2. supports a record oriented disk I/O;
3. supports several serial ports running the RDU-UDP protocol;

4. supports UDP-Host communications; and
5. supports necessary self-test and diagnostics.

The UDP software is structured in an event driven tasking system. Events are the occurrences of some hardware or software situations. Hardware events are caused by the interrupts from the serial ports, the keyboard, the display terminal, the disk control, and the real time clock. The software events are basically used for the inter-task communication purposes and can be defined according to the needs when they develop.

The tasks needed are as follows:
1. Display/Entry Task
2. Disk I/O Task
3. Network Communication Task
4. Host Communication Task
5. Diagnostic Task 1. The Display/Entry Task is the monitor of the UDP. It provides a set of commands for the user to control the operations of the UDP. The commands are displayed as a menu on the display terminal screen and activated by a menu selection. On-line help of the commands is also supported. The detail of the commands are as follows:

(a) edit customer record

When the edit customer record is activated, the UDP will display the format of a customer's record on the screen and position the cursor in the appropriate place for entering and editing the record. The 'RETURN' key is used to terminate a field and move the cursor to the next field. Within a field, the ← and '→' keys are used to move the cursor left and right. If the field boundary is reached in either the left move or right move operation, the cursor is moved to the previous or the next field. The 'Up-Arrow' and 'Down-Arrow' keys are used to move the cursor to the beginning of the previous or next field. At the cursor position, any key entered will be put into the field and the cursor key entered will be put into the field and the cursor will be moved to the next position. At any position in a field, the 'RETURN' key terminates the field and clears any other characters in the remaining positions.

Several function keys are used to process the record being edited on the screen:
+F1—Writes the record into the UDP database.
+F2—Updates the old record with the one on the screen.
+F3—Retrieves a record for editing/display.
+F4—Dispatches the record for forwarding to the RDU. Another record, derived from the customer record and used by the network communication protocol, is created. This record is called the protocol record, which contains only the fields used by the protocol.
+F5—Removes a record from the database.

(b) display protocol records

This command displays protocol records in either the receive queue or the transmit queue. The protocol records in the queues are in the time sequential order according to the time a record is to be sent to the RDU or received from the RDU. No editing of the protocol records is allowed.

(c) delete protocol records

This command removes a protocol record from the transmit queue, if it has not been sent.

(d) merge records

This command takes a protocol record from the receive queue according to the order in which it came and updates the customer records with the new information received from the RDU. The operation continues until all records in the receive queue are merged or the command is terminated by an 'ESC' key.

(e) display status

This command displays a menu of the available status of the UDP on the screen and displays the status upon a menu selection. The possible status information includes:
+ Communication protocol status transmitting, receiving, idling, protocol record being processed, etc. . . ;
+ Receive/transmit queue status;
+ Customer record database status;
+ send to host (this command sends a file of customer records to the host computer); and
+ receive from host (this command receives a file of customer records from the host computer).

2. The Disk I/O Task is a utility task for reading and writing a record to and from the hard disk. This is no different from the ordinary disk I/O functions available in the MS-DOS (of Microsoft Corp.) except that the operation can not take the control of the entire processor while waiting for the disk I/O to complete. This is achieved by the event driven tasking mechanism.

3. The Network Communication Tasks each control a serial port. The transmit portion of the task uses the customer's information from a protocol record to communicate with an RDU. It initiates the communication by dialing the customer's telephone number at the specific time window. It sends the commands to the RDU. At the end of sending, if it does not expect anything reported from the RDU, it terminates the communication. It activates the receive portion of the protocol, if information is expected from the RDU. The receive protocol, collects the reports from the RDUs and composes them into protocol records and stores them in the receive queue. If a record did not get transmitted completely, it is re-scheduled accordingly. If a record was not received completely, it is indicated in the record so that special actions can be taken later.

4. The Host Communication Task is a file transfer task for sending files containing customer records to and from the host computer.

5. The Diagnostic Task provides an on-line diagnostic of the UDP.

It will accordingly be seen that the present invention provides a system capable of automatically reading meters using various types of sensors over two-way communication lines permitting ready collection of usage data by a utility without the personal intervention of an end-user or utility personnel. The system includes digital communication with protocol and security protections, on-hook operation and power conservation measures using telephone line power with battery backup, and Local Area Network expansion capability.

We claim:

1. A device for automatically collecting and storing utility usage data at the utility users premises and transmitting the utility usage data to an information storage facility at a location remote from the users premises comprising:

(a) interface means for converting the utility usage data read by a conventional utility meter into a signal that can be automatically recorded;

(b) a microprocessor means at the user premises for controlling the device and for automatically receiving and recording the data signal generated by the interface means, said microprocessor means having the capacity to be in either a powered down inactive mode or a power active mode and for causing the telephone line to go OFF-HOOK upon receiving a signal emitted from ring detection circuitry for enabling the device to respond to an incoming telephone call before the telephone rings;

(c) means for transmitting the data signal to said microprocessor means;

(d) means for powering the device;

(e) means for energizing said microprocessor means from the powered down inactive mode to the power active mode only when active functions must be performed by said microprocessors;

(f) a telephone line extending from the users premises for automatically transmitting said recorded information from said microprocessor means to the information storage facility at a location remove from the user premises;

(g) a conventional telephone at the user premises connected to said telephone line;

(h) ring detection circuitry having a transistor; zener diodes and a capacitor in series connected to one lead of the transistor and a resistor connected to another lead of the transistor which ring detection circuitry emits a signal to the microprocessor in several microseconds; and (i) means to transmit the signal emitted by the ring detection circuitry to the microprocessor.

2. A device for automatically collecting and storing utility usage data at the utility users premises and transmitting the utility usage data to an information storage facility at a location remote from the users premises comprising:

(a) interface means including a sensor for converting the utility usage data read by a conventional utility meter into a data signal that can be automatically recorded;

(b) microprocessor means at the user premises for controlling the device and for automatically receiving and recording the data signal generated by the interface means, said microprocessor means having the capacity to be in either a powered down inactive mode or a powered active mode;

(c) means for transmitting the data signal from the interface means to the microprocessor means;

(d) means for powering the device;

(e) means for energizing the microprocessor means from the powered down inactive mode to the powered active mode only when active functions must e performed by the microprocessor;

(f) means for automatically transmitting said recorded information from the microprocessor means to an information storage facility; and (g) a first signal line from said sensor in the interface means; a second signal line form said sensor; circuitry means for making the first and second signal lines from said sensor of opposite polarity at all times; and means for detecting the polarities of said first and second signal lines wherein detection of any change in polarity of said signal lines will indicate an inaccurate reading of the utility usage data received by the microprocessor.

* * * * *